Patented May 14, 1929.

1,712,917

UNITED STATES PATENT OFFICE.

FERDINAND FLURY, OF WURZBURG, GERMANY, ASSIGNOR TO THE FIRM: DEUTSCHE GESELLSCHAFT FUR SCHADLINGSBEKAMPFUNG M. B. H., OF FRANKFORT, GERMANY.

VERMIN KILLER.

No Drawing. Application filed August 29, 1921, Serial No. 496,627, and in Germany April 8, 1920.

The invention relates to an improved vermin killer for closed rooms.

The hitherto employed poisonous vermin or insect killers or fumigators have the drawback that their presence is not easily detected by human beings. More particularly the frequently employed prussic acid has only a faint odor, so that it may easily happen that portions of the gas remain in or escape from rooms, in which vermin is to be destroyed and may detrimentally affect human beings without being detected.

The object of this invention is to employ substances for killing vermin, which besides the poisonous properties have a strongly irritating action on the human organism particularly the respiratory organs, so that human beings are not only instantly warned of the presence of the obnoxious gas, but are also owing to the irritating action of the gas prevented from breathing comparatively large quantities of it. In this way accidents incidental to the employment of these substances are rendered almost impossible.

With this end in view substances which have an irritating effect upon the human organism may be added to the usually employed poisonous substances. A suitable substance for giving the warning is cyano-carbonic alkyl ester, e. g., cyano-carbonic ethyl ester ($NC.CO.O.C_2H_5$), which is almost as poisonous as the prussic acid and which has a strongly irritating effect. The cyano-carbonic acid ester of commerce contains a rather large percentage of chloro-carbonic alkyl ester, e. g., chloro-carbonic ethyl ester ($Cl.CO.O.C_2H_5$), whereby its irritating action is still further increased. Other cyanide derivates have similar properties and a further novel feature of the invention consists in employing such cyanide derivates instead of or together with cyanide of hydrogen (prussic acid). Similar substances such as chloropicrin ($C.Cl_3.NO_2$) may also be employed in conjunction with other poisonous gases, for instance carbonic oxide. The cyanide derivates are either evaporated or fumigated in the room under treatment or squirted or splashed about. Preferably such cyanide derivates are employed, in which the hydrogen of the prussic acid is replaced either by a halogen, or by another radical, for instance by the carboxyl ester group or by the cacodyl group $As(CH_3)_2$. Cacodylrhodanid may equally well be employed for the purpose. A suitable mixture for the purpose consists of cyano-formic acid ester CNCOOR to which a small addition of chloro-formic acid ester has been made or which has detained a small quantity of it. By employing the irritating substances mentioned as an addition to the prussic acid the irritating effect disappears simultaneously with the poisonous effect, as the irritating substances behave chemically or physically similar to the poisonous substances particularly with respect to volatility.

It will be readily understood that I do not limit myself to the irritating substances mentioned, by way of example, but that any other substances which have an irritating effect upon the human respiratory organs may equally well be employed for this purpose.

What I claim as my invention and desire to secure by Letters Patent is:

1. As a new composition of matter, a gaseous mixture containing a highly poisonous gas not easily detected by human beings, and chlorocarbonic ethyl ester.

2. A fumigant comprising a mixture of hydrocyanic acid and a warning lachrymatory halogen derivative of carbonic acid volatile at the volatilization temperature of hydrocyanic acid and capable of forming a permanent vapor mixture therewith, said halogen derivative of carbonic acid being present in said mixture in an amount effective to expel the higher animals.

3. A fumigant comprising a mixture of hydrocyanic acid and a halogen carbonic alkyl ester volatile at the volatilization temperature of hydrocyanic acid and capable of forming a permanent vapor mixture therewith and present in said mixture in an amount effective to expel the higher animals.

4. As a new composition of matter, a gaseous mixture containing hydrocyanic acid gas and chloro-carbonic ethyl ester.

5. A fumigant comprising hydrocyanic acid chlorocarbonic ethyl ester and a cyano-carbonic ethyl ester.

In testimony whereof I affix my signature.

FERDINAND FLURY.